UNITED STATES PATENT OFFICE.

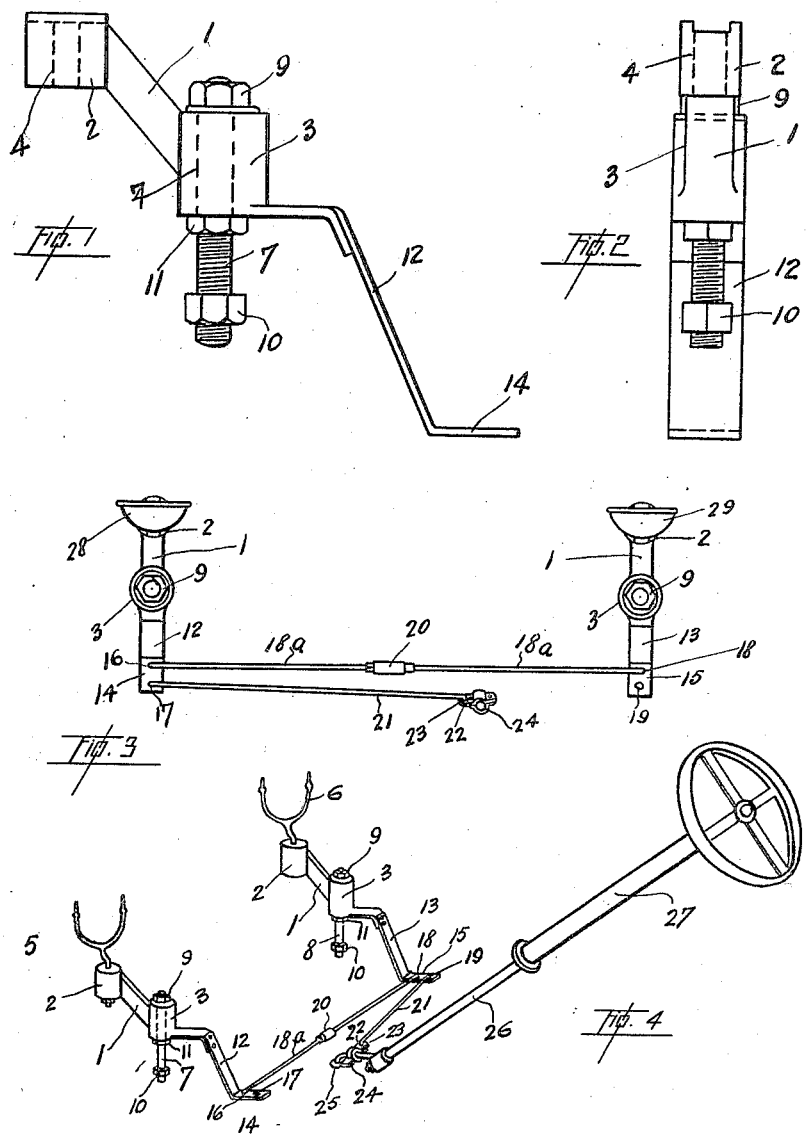

DWIGHT E. KIDDER, OF MINNEAPOLIS, MINNESOTA, ASSIGNOR OF ONE-HALF TO MAGNUS E. OLSON, OF VANCOUVER, BRITISH COLUMBIA, CANADA.

AUTOMOBILE-HEADLIGHT CONTROL.

1,343,143.     Specification of Letters Patent.     Patented June 8, 1920.

Application filed September 4, 1918. Serial No. 252,623.

*To all whom it may concern:*

Be it known that I, DWIGHT E. KIDDER, a citizen of the United States, and a resident of the city of Minneapolis, in the State of Minnesota, have invented certain new and useful Improvements in Automobile-Headlight Controls, of which the following is a specification.

My invention relates to improvements in headlight controls for automobiles with more particular reference to a device for controlling the headlights of Ford automobiles, and the object of my invention is to provide a simply constructed device of this nature adapted to be readily and easily installed at a low cost the use of which enables the lamps to turn automatically with the car so that they are always positioned parallel with the front wheels and thus the light is directed at all times on the road whether running straight ahead, turning bends or corners, or turning out when meeting a coming car, thereby rendering night driving much safer than when the lamps are not so turnable.

I attain this object by the construction illustrated in the accompanying drawings in which—

Figure 1 is a side elevation of one of the lamp bracket supports.

Fig. 2 is a front view of the same.

Fig. 3 is a plan view of the assembled device.

Fig. 4 is a perspective view of the installation.

Similar figures of reference indicate similar parts throughout the several views.

1 indicates the head lamp supports, there being a pair of these supports, each formed preferably as shown in Figs. 1 and 2, having the bosses 2 and 3, each boss 2 having a vertical bore 4, indicated by the dotted lines in Fig. 1, adapted to receive the head lamp brackets 5 and 6 respectively, as shown in Fig. 4, and each boss 3 having a bore whereby the supports may be rotatably mounted respectively on spindles 7 and 8, as indicated by the dotted lines in Figs. 1 and 4, the part of the spindles on which the supports are mounted being plain and the part above and below the boss being threaded to receive the nuts 9 and 10 respectively, as shown in Fig. 1, each spindle being provided with a nut 11 adapted to form a shoulder on which the respective support rests when the device is assembled.

12 and 13 indicate extensions formed on the bosses 3, these being turned downwardly and rearwardly, as shown, the rearwardly turned portions 14 and 15 being provided with apertures 16—17 and 18—19 and being connected together by means of a rod 18$^a$ having downwardly turned ends engaging the apertures 16—18, which rod is formed in two parts adjustably connected together by a clevis 20. 21 indicates a pull rod having its opposite ends turned downwardly and engaging respectively the aperture 17 or 19 and an aperture 22 formed in the lug extension 23 of a clamp 24, as shown in Fig. 3, which clamp is adapted for connection to the steering gear ball arm 25 or if preferred to the steering gear connecting rod (not shown).

26 indicates the steering gear post, 27 the steering gear tube, and 28—29 the head lamps, all of which are as found on Ford cars at the present time.

The manner in which the device is installed and operated may be described briefly as follows:—The head lamp brackets 5 and 6 are removed from the front fender irons thus permitting the support spindles 7 and 8 to be mounted rigidly thereon, the lower ends of the spindles being placed in the lamp bracket holes in the right and left front fender irons respectively and tightened up by means of the nuts 10, the supports being then swingable on the plain portion of the spindles, which act as pivots. The head lamp brackets may then be mounted in and secured to the bosses 2 in the same manner as they were secured in the fender irons, the extensions 12 and 13 of the supports connected to each other by the rod 18$^a$ and adjusted to their proper positions relative to each other and parallel to the front wheels by the clevis 20, and the rod 21 connected to the steering gear ball arm or connecting rod, as preferred, by the clamp 24, after which it will be evident that the operation of the steering wheel will then swing the supports about their pivots in either direction, according to the direction of movement of the steering wheel, so that the head lamps are at all times maintained parallel to the front wheels.

What I claim as my invention is:

A device of the character described comprising a partly plain and partly threaded spindle, the plain portion of the spindle being formed between threaded portions thereof and positioned adjacent the upper end and the lower threaded portion of the spindle being adapted for insertion through the usual lamp bracket receiving opening formed in the fender iron of an automobile, retaining nuts on the lower threaded portion of the spindle adapted to engage upper and lower surfaces of said fender iron, a boss rotatably mounted on the plain portion of the spindle and supported by the upper of said nuts, an additional retaining nut for the boss threaded on the upper end of the spindle, a forward extension carried by the boss adapted to support a lamp bracket and a rearward extension carried thereby adapted to be connected to the steering gear.

Dated at Vancouver, B. C., this 23rd day of August, 1918.

DWIGHT E. KIDDER.